INVENTORS
R. M. SCHIRMER
E. H. FROMM
BY
ATTORNEYS

United States Patent Office 3,264,065
Patented August 2, 1966

3,264,065
PROCESS AND APPARATUS FOR PRODUCING
CARBON BLACK
Robert M. Schirmer and Ellsworth H. Fromm, Bartlesville, Okla., assignors to Phillips Petroleum Company, a corporation of Delaware
Filed May 18, 1962, Ser. No. 195,764
14 Claims. (Cl. 23—209.6)

This invention relates to the production of carbon black from hydrocarbon fluids. In one aspect the invention relates to the continuous production of hydrocarbon fluids under superatmospheric pressure. In another aspect this invention relates to the production of carbon black by passing a hydrocarbon fluid annularly along the periphery of a cylindrical reaction zone and passing an oxidizing fluid through the center of the reaction zone on the axis thereof as a swirling mass contacting said reactant at an interface which is a generally cylindrical zone. In another aspect our invention relates to a novel carbon black.

Although carbon black finds great utility in a number of applications, probably its greatest utility is in the field of rubber reinforcement, especially in the rubber tire industry. Our invention is useful for producing carbon black particularly suitable for use in rubber tires for vehicles.

The recent history of the production of carbon black has been marked by a pronounced trend to furnace black methods and a decline in the use of channel black methods. In prior furnace black processes, atmospheric or substantially atmospheric pressures have been used. Many types of reactant and oxidizer feed patterns have been utilized, and these patterns have an appreciable effect on the properties of the black produced as well as on reaction variables such as conversion, for example. Most of the prior art processes provide almost complete mixing of reactant and oxidizer and thus provide little or no control of contact between the two and no protection of the reactor walls. In many carbon black manufacturing plants it is necessary to utilize a plurality of carbon reactors to obtain the desired plant capacity.

An object of our invention is to increase the reactant throughput per unit reactor volume in the production of carbon black.

Another object of our invention is to provide for orderly combustion and the resulting accurate control of the contact of the reactant with the oxidizer and rigidly controlled residence time.

Another object of our invention is to reduce the reactor wall temperature thus permitting the use of less expensive reactors.

Another object of our invention is to provide an efficient process for the production of carbon black.

Another object of our invention is to provide superior carbon black producing apparatus.

Another object of our invention is to produce a novel carbon black.

Other aspects, objects and the advantages of our invention are apparent in the written description, the drawing and the claims.

According to our invention a highly reinforcing carbon black for use in rubber is prepared by the controlled combustion of suitable hydrocarbon oils in a continuous process characterized by the use of superatmospheric pressure.

Also according to our invention a process is provided for producing a carbon black by continuously feeding a fluid hydrocarbon reactant into a generally cylindrical zone, passing the fuel through the zone in an annular mass adjacent the periphery of the zone, continuously feeding a fluid oxidation agent into the zone, passing the agent through the zone in a rotating axial core in contact with the fuel and maintaining conditions of pressure, temperature, feed rates, and residence time to produce carbon black from the reactant. Preferably the pressure in the zone is maintained in the range of 8–30 atmospheres and the temperature in the range of 2400–3000° F. although the temperature may range from 2000 to 3300° F. The residence time is in the range of 5 to 400 milliseconds.

Further, according to our invention there is provided apparatus for the production of carbon black comprising a generally cylindrical reactor, means to feed a hydrocarbon reactant annularly along the periphery of the reactor, means to feed a fluid oxidizing agent axially through the reactor as a rotating axial core, and means to remove the reaction products from the reactor.

Preferably means are provided to inject a quench fluid near the downstream end of the reactor. Advantageously the quench is passed through a chamber surrounding the reactor in indirect heat exchange with the reaction space. It is advantageous in some instances to provide means for increasing the rate of mixing at a midpoint within the reaction space, preferably by providing an annular protrusion around the reactor wall.

The process of the present invention differs from prior art continuous processes in that above atmospheric pressures are used and a novel method of introducing the hydrocarbon feed and oxidant to the combustion zone is employed. In the practice of our invention, the same material serves both as reactant for producing carbon black and for fuel to supply the heat of reaction and, therefore, the words "fuel" and "reactant" are used more or less interchangeably. Operational pressures of 8–30 atmospheres and the resulting increased reactant densities provide smoother, more convenient operation by which greatly increased reactant throughputs per unit reactor volume are realized. The annular introduction of fuel and the axial introduction of air into the combustion chamber of the invention furnaces provide an axial core of air which swirls through an annulus of fuel, which has preferably been vaporized, with mixing being accomplished at the extensive shear interface between the fuel and air streams. In the reactor the wall is blanketed with an annulus of fuel. Thus, full advantage is taken of the radiant energy of the flames to preheat and carbonize the fuel. Apparently combustion is effected at the highly turbulent shear interface between the fuel and the air, and therefore, the combustion occurs near the periphery of the reactor wall and in the mixing zone at the interface. The invention avoids the almost complete mixing of fuel and air which exists in prior art processes and the orderly combustion carried out in the present process results in contact of the fuel with the optimum quantity of air and a rigidly controlled residence time. A controlled residence time is obviously important in a carbon black reactor, there being at any given temperature, a minimum time required to adequately carbonize the fuel and a maximum time beyond which the carbon black particle may be degenerated to undesirable byproducts.

In addition to producing high quality carbon black, our process has operational advantages in the ability to utilize lower hydrocarbon feed temperatures due to the lower ignition temperatures experienced with the pressurized combustion system. Further, steel reaction chambers may be used in place of the more costly ceramic lined chambers of the prior art. At the higher density the screening action of the pyrolytic carbon apparently absorbs most of the flame radiation to permit using steel reactor walls. Inspection of the reactor walls even after prolonged operation reveals that no appreciable carbon tends to form thereon. Still further, the process is considerably less selective of feedstocks. In addition to the conventional $SO_2$ extract oil (essentially aromatic) feedstock the process may also use the $SO_2$ raffinate (essentially paraffinic) and has in fact produced carbon black from lower paraffins such as heptanes.

In the accompanying drawing FIGURE 1 is a diagrammatic sketch of the carbon black reactor actually used in the development of the invention.

Figure 1:
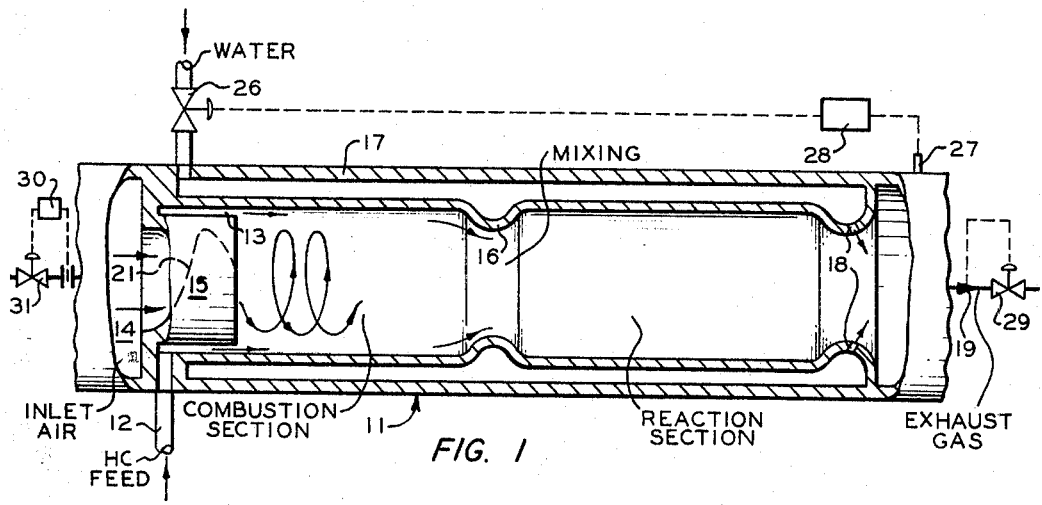

Referring to FIGURE 1, the reactor 11 is horizontally placed and is fed at 12 with the hydrocarbon feed which proceeds from a hydrocarbon preheater (not shown). The fuel then proceeds through the annular space 13 and horizontally along the reactor wall. Air, proceeding from an air preheater (not shown), enters the reactor at 14, proceeds through an axial air inlet 15 and spirals through the combustion section as a rotating core within the annulus of fuel. At constriction 16 the reaction mixture is forced into increased turbulence and the carbonization is completed in the reaction section. Cooling water enters the reactor jacket 17, cools the reactor wall, and is metered through quench ports 18 to halt the reaction. The reactor effluent, containing the carbon black product, quench steam, and reaction by products, leaves the reactor at 19, proceeds through a pressure control valve 29 and through conventional flocculation, separation, bagging and venting units (not shown). Spiral vanes 21 are placed in inlet 15 to impart the spiral swirling motion to the air.

In some instances the amount of quench desired is insufficient for the cooling desired in the reactor jacket 17 and, in such instances, an additional outlet from jacket 17 (not shown) is provided so that a portion of the cooling water entering the jacket can be withdrawn without discharging through quench ports 18. Also in some instances, it is desirable to omit constriction 16 and allow the reaction to continue without additional mixing. A more conventional quench inlet, such as a spray in the outlet from the reactor can be used.

In the operation of the process according to the invention, the hydrocarbon feed can be sprayed or atomized into the reactor by any conventional metering device, and can be preheated by any convenient means such as gas fired or electrical heat exchangers to a temperature which is generally about 30–90% of the boiling point of the fuel. Under typical conditions a substantial portion of the fuel enters the reactor in the vapor state. The hydrocarbon fuel temperature can vary to a great extent, particularly with unusually low or high boiling fuels, the essential requirement being that it arrives in an ignitable condition in the combustion zone. The fuel flow rate varies with other conditions such as the size of the reactor, the reactor temperature, and the reactor pressure. We have found that, with a reactor having an internal diameter of 2 inches, a length of 12 inches from air and fuel inlet to quench inlet, and with constriction 16 at about mid-point, operating at 15 atmospheres of pressure and about 2,800° F. using a highly aromatic hydrocarbon oil as the fuel, the fuel rate can vary from 25 to 200 pounds per hour.

Air can be pumped and preheated by any convenient means such as a rotary pump and an electrical or gas fired heat exchanger to a temperature of about 700–2000° F. and preferably to about 1000–1200° F. The spiral rotary motion can be effected by the use of one or more tangentially located ports, or, alternatively, by the use of suitable louvers or vanes, such as vanes 21 in the drawing, which are capable of imparting the desirable air rotation within the reactor. The hydrocarbon/$O_2$ ratio varies with operating conditions and with the desired photelometer values for the product black but generally range from 0.4 to 1.6 and usually is about 0.9 lbs. hydrocarbon/lb. $O_2$. Expressed in a slightly different manner the hydrocarbon to $O_2$ ratio for the production of carbon black according to our invention is in the range of 1.4 to 5 times stoichiometric, preferably 2 to 4 times. When the feed stock is paraffinic the hydrocarbon to $O_2$ ratios generally are lower, and conversely, when the feed stocks contain appreciable amounts of aromatic hydrocarbons, the ratios are higher.

The temperature within the combustion and reaction zones of the carbon black reactor can be varied within wide limits. This temperature can range from 2000 to 3300° F., but preferred reactor temperatures are from about 2400 to about 3000° F.

The rate of cooling water pumped into the reactor jacket depends upon the reactor temperature desired and varies widely. The jacket water is also metered into the core of the reactor at a point at the end of the reaction zone to quench the reaction and prevent excessive decomposition of product. Care must be taken to provide sufficient quenching fluid for this purpose and yet prevent excessive quench water usage which would interfere with subsequent carbon recovery operation. The condensation of water vapor in the product carbon is to be avoided. As noted above a by-pass valve is generally provided on the jacket water system so that the portion of the jacket water used to quench the reaction can be rigidly controlled. Although quench injection through ports in a restricted section at the outlet of the reactor, more conventional quench injection, or by a spray in the outlet pipe can be used.

Suitable control means for our invention include control of the amount of quench fluid by control of valve 26 by means of a temperature probe 27 and a controller 28. The pressure in the reactor can be controlled by back pressure valve 29 while the residence time can be controlled by a flow controller 30 regulating valve 31 in the air inlet line. If desired the reactants can be fed as a controlled ratio of the air.

While carbon black of some sort can be produced from any hydrocarbon, it has been found that the best carbon black for rubber reinforcement is one that has relatively small particle size.

In order to produce such small particle size grades of carbon black in high yield per pound of feedstock, it is preferable to employ a liquid hydrocarbon feedstock as the source of said carbon black. Said liquid hydrocarbon feedstock may be a petroleum distillate, or a petroleum residual oil, or a coal tar distillate, or a coal tar residual oil, it should have a substantial aromatic content, and may be fed in vapor form if substantially vaporizable, or as an atomized spray of droplets into the furnace. With regard to the use of petroleum oils, the following aromatic streams from an oil refinery are used commercially: (1) recycle gas oil from catalytic or thermal cracking; (2) synthetic tars from catalytic or thermal cracking; (3) cracked residues; and (4) vacuum still overhead streams and tarry residuums therefrom; or (5) aromatic streams recovered by solvent extraction of any of these streams (1) to (4).

From the standpoint of economics it is preferred to use liquid feedstocks having a U.S. Bureau of Mines correlation index (BMCI) of at least 80, preferably over 90 and more preferably over 110. The formula used is as follows:

$$\text{BMCI} = \left( \frac{876}{460+F} + \frac{670}{131.5+\text{API}} - 4.568 \right) 100$$

wherein "F" is the boiling point in ° F. at the 50 percent recovery distillation point and "API" is the American Petroleum Institute gravity at 60° F. Also from an economic standpoint the initial boiling point should be at least 170° F., preferably above 400° F. and most preferably above 550° F. It is preferred that the API gravity should be as low as possible, at least less than 25, preferably less than 10, most preferably 5 and below.

The best feedstock preferably has a low carbon residue and a low pentane insoluble content of less than 5 weight percent for petroleum oils and less than 10 weight percent for coal tars.

The oxygen and/or nitrogen content of the feedstock appears to only reduce the yield and not effect the quality. Sulfur is not objectionable in carbon black from a quality standpoint, but unusually large amounts in carbon black can cause corrosion in the carbon black-producing equipment. It is therefore desirable from a marketing standpoint to use a feedstock with a sulfur content of less than 3 weight percent, preferably less than 1 weight percent.

The ash content should be low, generally below 0.5 weight percent, preferably below 0.2 weight percent, in order to keep the refractory bricks in a carbon black furnace employing such a lining from fluxing, as the ash has little effect at all on the carbon black quality. The viscosity is unimportant except from a mechanical standpoint of difficulties of pumping and spraying.

Of course, virgin crude oil fractions, or aromatic-selective solvent extracts therefrom, can be employed when they have the preferred qualities discussed above, but generally they will be found somewhat lacking in some of these preferred qualities, so that while carbon black may be made from them, they are not preferred as feedstocks for carbon black manufacture.

As an example of one preferred residual feedstock we may employ an atomized spray of a normally liquid hydrocarbon having a hydrogen-to-carbon atomic ratio below 1.5 and preferably in the range of 0.75 to 1.25; a mean molecular weight above 140 and preferably from 225 to 550; an API gravity less than 20 and preferably less than 10; a viscosity low enough to permit handling, but usually above 30 SUS at 210° F.; and a low Conradson carbon residue, which however may be in excess of 1.5 weight percent, or even in excess of 3 weight percent.

As an example of one preferred distillate feedstock we may employ a recycle gas oil derived from a cracking process and having an API gravity of 16 to 25, an initial boiling point of 400 to 600° F. and an end point of from 600 to 800° F. The carbon residue is generally low, such as 0.21 for example, although the carbon residue is not critical. However, oils boiling above or below this preferred range may also be utilized as well as paraffinic stocks. In fact other feedstocks such as hydrocarbon gas, liquids such as pentane, hexane, or even gasolene or kerosene boiling range may be used.

The invention is further illustrated by the following examples.

EXAMPLE I

Figure 2:
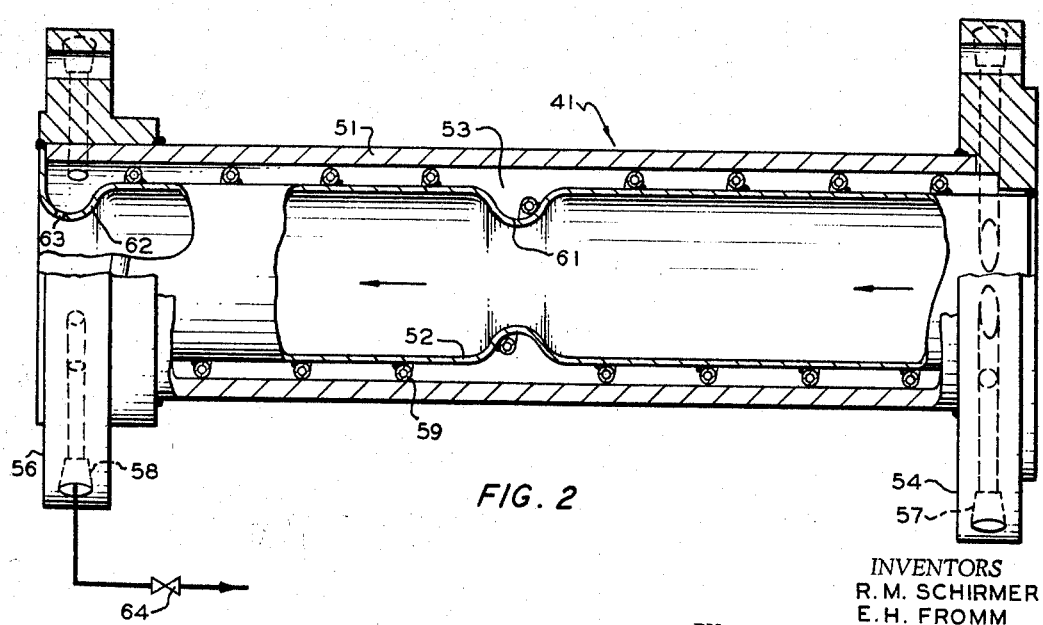
FIGURE 2 is an illustration of a reactor used to test our invention.
Figure 3:
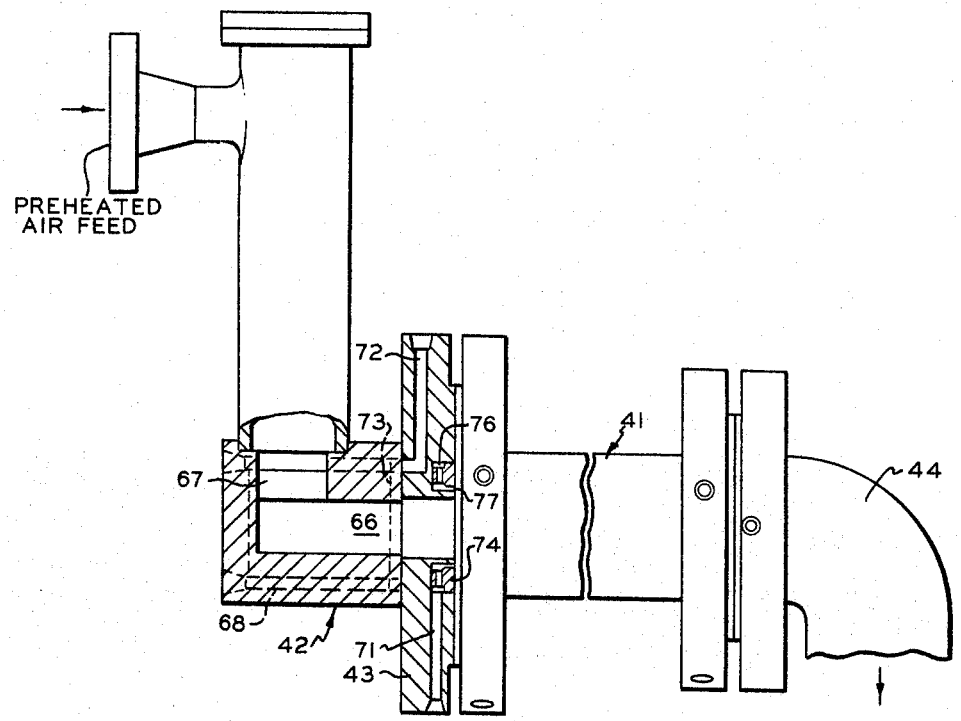
FIGURE 3 is an illustration of the reactor of FIGURE 2 with associated equipment.

Our invention was tested in apparatus made as shown in FIGURE 2 and FIGURE 3, in which the reactor was one foot by two inches. The apparatus comprises a reactor 41, an inlet cyclone chamber 42, a reactor feed plate 43, and a reactor discharge pipe 44, along with necessary feed and control means (not shown).

Reactor 41 includes a cylindrical shell 51, and an inner chamber wall 52, shell 51 and wall 52 together defining an annular passage 53. Inlet flange 54 and outlet flange 56 are attached to reactor 41 as shown and are provided with quench fluid inlet passages 57 and outlet passages 58 respectively. There are four inlet passages 57 drilled to enter passage 53 tangentially to cause the quench fluid to have a swirling motion and a spiral section of tubing 59 is provided to continue the swirling motion throughout passage 53. Four outlet passages 58 are provided and these are drilled radially. Wall 52 includes a reduced diameter portion 61, thus providing a restriction to the flow therethrough, to increase mixing at this point, and a reduced diameter portion 62 at the outlet end which is provided with quench fluid inlets 63. Preferably a valve 64 is provided to control the flow through outlet passages 58 to thereby regulate the rate of flow of quench fluid through passage 53. By controlling the inlet pressure of the quench fluid and by regulating the amount which flows through valve 64 the amount which is forced through quench fluid inlets 63 and the amount which is by-passed through valve 64 can be regulated to provide the desired combination of cooling of wall 52 and quenching the reaction products.

In cyclone chamber 42 there is a cylindrical longitudinal passage 66, an inlet passageway 67 tangent to passage 66, and a plurality of coolant passages 68. Reactor feedplate 43 is provided with four reactant inlet passages 71 and four coolant inlet passages 72, alternated at equal intervals around the circumference of feed plate 43. Coolant passages 72 communicate with an annular passage 73 in cyclone chamber 42 and passage 73 in turn communicates with each of passages 68. A feed ring 74 which fits into an annular groove 76 in feed plate 43, provides an annular feed passage 77.

A heavily aromatic reactant feed obtained by the $SO_2$ extraction of a hydrocarbon oil was used in this example. The reactant had the following characteristics:

| | |
|---|---|
| Gravity, API | 10.9 |
| Refractive Index, $N_D^{20}$ | 1.5898 |
| Distillation, ASTM D 86–59, ° F.: | |
| IBP | 465 |
| 5 | 558 |
| 10 | 582 |
| 20 | 604 |
| 30 | 650 |
| 40 | 636 |
| 50 | 652 |
| 60 | 666 |
| 70 | 688 |
| 80 | 722 |
| 90 | 750 |
| Rec., percent | 91.0 |
| Residue, percent | 9.0 |
| Loss | 0.0 |
| Pentane insoluble, percent | 0.08 |
| Bureau of Mines Correlation Index | 93.3 |
| Ramsbottom carbon residue, percent | 1.78 |
| Carbon content, wt. percent | 89.05 |
| Hydrogen content, wt. percent | 9.30 |
| Sulfur content, wt. percent | 1.5 |
| Water content, wt. percent | 0.0321 |
| Pour point, ° F. | 50 |
| Viscosity: | |
| SUS at 100° F. | 75.86 |
| SUS at 210° F. | 35.02 |
| B.S. & W. | Trace |
| Aniline point, ° F. | 166.4 |

The essential operating conditions and product tests are reported in Table I below:

Table I

| | |
|---|---|
| Pressure, atmospheres | 15.1 |
| Air flow rate, lbs./hr. | 720 |
| Air inlet temp. ° F. | 1100 |
| Flow velocity, ft./sec. | 22.5 |
| Residence time, sec. | 0.044 |
| Oil flow rate, lbs./hr. | 78 |
| Mixture ratio, lbs. hydrocarbon/lb. $O_2$ | 0.47 |
| Yield, lbs./gal. | 1.0 |
| Photelometer, percent trans | 93 |
| Benzene extractable, percent | 3.2 |
| $N_2$ adsorption surface area, m.²/g. | 79 |
| Oil absorption, cc./g. | 1.17 |
| pH, Slurry | 8.1 |
| Diphenylguanidine adsorption | 13.3 |
| Michelin iodine No. | 162 |
| $NaBH_4$ reduction | 0.012 |

As is seen from the data in this table our process is capable of producing more than 400 lbs. of carbon black per hour per cubic foot of reactor volume. This value is at least 2–3 times the volumetric productivity reported in many prior art processes.

To further evaluate the carbon black produced by our process, it was tested as a rubber reinforcement in a standard recipe which contains the following ingredients in parts per 100 parts Philprene 1500 rubber; 50 carbon black, 3 zinc oxide, 1 stearic acid, 1 Flexamine antioxidant, 5 Philrich-5 extender and plasticizer and 1.75 sulfur. For comparison purposes a similarly compounded formulation with commercial Philblack A carbon black is also included. After curing, the two reinforced rubber formulations exhibited the following properties which are listed in Table II.

*Table II*

| Rubber Properties | Reinforced with Invention Black | Reinforced with Philblack A |
|---|---|---|
| Accelerator Level, phr | 1.3 | 0.8 |
| 300% Modulus, p.s.i | 1,550 | 1,970 |
| Tensile, p.s.i | 3,450 | 3,000 |
| Elongation at break, percent | 590 | 450 |
| Shore Hardness | 62 | 66 |
| Δ T, °F | 65.2 | 60.8 |
| Resilience, percent | 56.6 | 66.4 |
| NBS Abrasion, rev./mil | 7.3 | 6.2 |
| Aged 24 hrs. at 212° F.: | | |
| Modulus, p.s.i | 2,190 | |
| Tensile, p.s.i | 2,750 | 2,640 |
| Elongation, percent | 390 | 270 |
| Δ T, °F | 63.2 | 52.1 |
| Resilience, percent | 61.3 | 72.1 |

From the preceding data it is seen that the carbon black from the invention process yields a reinforced rubber which is largely equivalent to that produced from a commercial Philblack A. In several properties, namely, 300% modulus, tensile, elongation, and abrasion some superiority for the invention process black is indicated. The 300% modulus and abrasion are particularly important in automobile tire applications since they significantly affect cornering "squeal" and wear respectively, lower modulus reducing "squeal" and higher modulus reducing wear.

The following is a list of definitions of products and test procedures utilized in the above description of our invention.

Flexamine: antioxidant; 65% diarylamine-ketone reaction product and 35% N,N-diphenyl-p-phenylenediamine; Naugatuck Chemical.
Philrich-5: extender and plasticizer; aromatic petroleum oil; Phillips Petroleum Company.
Philprene 1500: butadiene-styrene copolymer emulsion polymerized at approximately 41° F., containing 22.5–24.5% bound styrene; Phillips Chemical Company.
Philblack A: fast extruding (medium abrasion) furnace black; Phillips Chemical Company.
Photelometer: a qualitative measure of the extractable tarry component of carbon black; ASTM D 1618–58T
Benzene Extractables: a quantitative measure of the soluble, tar content of carbon black; the percent weight loss of 1.75 g. carbon black after extraction with hot benzene for 5 hours.
pH: the pH of a suspension of carbon black and water; ASTM D 512–60.
DPG Adsorption: the number of microequivalents of diphenylguanidine adsorbed by one gram of carbon black; determined by back titration of benzene solution of diphenylguanidine with standard methanolic HCl using tetrabromophenylsulphonephthalein indicator.
Oil Absorption: The volume of oil required to convert a known weight of a black to a stiff paste or coherent ball; ASTM D 281–31
Surface Area: The method using the Brunauer, Emmett, and Teller Theory (B.E.T. method) involving the low temperature adsorption of a monomolecular layer of nitrogen.
Michelin Iodine No.: mg. iodine adsorbed by one gram carbon black which has been primarily devolatilized by heating in absence of air.
$NaBH_4$ Reduction: percent hydrogen uptake per gram of carbon black; a measure of quinone type surface groupings.
Modulus, tensile and elongaton, ASTM D 412–51T.
Δ TF and Permanent Set, ASTM D 623–58 Method A.
Resilience-Lupke Rebound, "Vanderbilt Rubber Handbook," p. 220 (1958).
Shore Hardness—ASTM D 676–58T

EXAMPLE II

An additional run was made with apparatus made as illustrated in FIGURE 2 and FIGURE 3 except that reduced diameter portion 61 was omitted and the quench was sprayed into reactor discharge pipe 44, approximately on an extension of the axis of reactor 41. Operating conditions and carbon black characteristics are given in Table III.

*Table III*

| | |
|---|---|
| Pressure, atmospheres | 15.1 |
| Air flow rate, lbs./hr. | 1080 |
| Inlet air temperature, °F. | 1140 |
| Flow velocity, ft./sec. | 34.6 |
| Residence time, milliseconds | 28.9 |
| Oil flow rate,[1] lbs./hr. | 188 |
| Mixture ratio, $HC/O_2$, lb./lb. | 0.76 |
| Photelometer, oil in black | 99 |
| Acidity, pH, slurry | 7.8 |
| Yield, lbs. carbon/gal. oil | 1.9 |
| Oil absorption | 1.13 |

[1] Same as in Example I.

Reasonable variation and modification are possible within the scope of our invention which sets forth method and apparatus for producing carbon black in a continuous reaction, at super-atmospheric pressure, method and apparatus for producing carbon black by contacting an annular moving body of hydrocarbon reactant with an axial spiralling body of oxidant, and novel carbon black produced by our process.

We claim:
1. A method for producing carbon black comprising:
continuously feeding a fluid hydrocarbon fuel into a generally cylindrical zone;
passing said fuel through said zone in an annular mass adjacent the periphery thereof;
continuously feeding a free oxygen containing fluid oxidation agent into said zone;
passing said agent through said zone in a rotating axial core in contact with said fuel and maintaining conditions of pressure, temperature and residence time to produce carbon black from said fuel.
2. A method for producing carbon black comprising:
continuously feeding a fluid hydrocarbon fuel into a generally cylindrical zone;
passing said fuel through said zone in an annular mass adjacent the periphery thereof;
continuously feeding a free oxygen containing fluid oxidation agent into said zone;
passing said agent through said zone in a rotating axial core in contact with said fuel;
maintaining a pressure in said zone in the range of 8–20 atmospheres;
maintaining a temperature in said zone in the range of 2,000–3,300° F.; and
maintaining a residence time sufficient to produce carbon black from said fuel.
3. The method of claim 2 wherein the temperature is maintained at a range of 2,400 to 3,000° F.
4. A method for producing carbon black comprising:
continuously feeding a fluid hydrocarbon fuel into a generally cylindrical zone;

passing said fuel through said zone in an annular mass adjacent the periphery thereof;
continuously feeding a free oxygen containing fluid oxidation agent into said zone;
passing said agent through said zone in a rotating axial core in contact with said fuel;
passing a fluid quenching medium around said zone in indirect heat exchange therewith;
maintaining conditions of pressure, temperature and residence time to produce carbon black from said fuel in said zone; and
injecting said quench medium into a downstream portion of said zone to reduce the temperature thereof sufficiently to stop the production of carbon black.

5. The process of claim 4 wherein said pressure is in the range of 8–30 atmospheres and said temperature in the range of 2,000–3,300° F.

6. The process of claim 5 wherein said temperature is in the range of 2,400 to 3,000° F. and said residence time is in the range of 5–400 milliseconds.

7. A process for producing carbon black comprising:
continuously feeding a fluid hydrocarbon fuel into a generally cylindrical zone;
passing said fuel through said zone in an annular mass adjacent the periphery thereof;
continuously feeding a free oxygen containing fluid oxidation agent into said zone;
passing said agent through said zone in a rotating axial core in contact with said fuel;
partially deflecting the flow of said gas and said core to increase mixing therebetween;
passing a quench medium around said zone in indirect heat exchange therewith;
maintaining within said zone conditions of pressure, temperature and residence time to produce carbon black from said fuel; and
injecting said quench medium into said zone after said deflecting.

8. The process of claim 7 wherein said pressure is in the range of 8–30 atmospheres, and said temperature is in the range of 2,000–3,300° F.

9. The process of claim 8 wherein said temperature is in the range of 2,400–3,000° F. and said residence time is in the range of 5–400 milliseconds.

10. Means for producing carbon black comprising:
a generally cylindrical reactor;
means for continuously feeding a fluid hydrocarbon fuel into said reactor;
means to control the inlet of said fuel into said reactor to pass said fuel in an annular mass adjacent the periphery of said reactor;
means for continuously feeding a fluid oxidation agent into said reactor;
flow directing means for controlling the inlet of said agent to form a rotating axial core in said reactor in contact with said fuel; and
means to maintain conditions in said reactor to produce carbon black from said fuel, comprising means to maintain the desired pressure, means to maintain the desired temperature and means to maintain the desired residence time.

11. Means for producing carbon black comprising:
a generally cylindrical reactor;
means for continuously feeding a fluid hydrocarbon into said reactor;
means to control the inlet of said fluid into said reactor to pass said fluid in an annular mass adjacent the periphery thereof;
means for continuously feeding a fluid oxidation agent into said zone;
flow directing means for controlling the inlet of said oxidation agent into said reactor to pass said agent through said zone in a rotating axial core in contact with said fuel;
means for passing a fluid quench medium around said reactor in indirect heat exchange therewith;
means to maintain conditions in said reactor to produce carbon black from said fuel, comprising means to maintain the desired pressure, means to maintain the desired temperature and means to maintain the desired residence time in said reactor; and
means to inject said quench medium in a downstream portion of said reactor to stop the production of carbon black.

12. Means for producing carbon black comprising:
a generally cylindrical reactor;
means for continuously feeding a fluid hydrocarbon fuel into said reactor;
means for controlling the inlet of said fuel into said reactor;
means for controlling the inlet of said fuel into said reactor to pass said fuel through said reactor in an annular mass adjacent the periphery thereof;
means for continuously feeding a fluid oxidation agent into said zone;
flow directing means to control the inlet of said agent into said zone to pass said agent through said zone in a rotating axial core in contact with said fuel;
obstruction means in said reactor to cause additional mixing of said fuel and said agent in an intermediate portion of said reactor;
means to maintain conditions in said reactor to produce carbon black from said fuel, comprising means to maintain the desired pressure, means to maintain the desired temperature and means to maintain the desired residence time;
means to pass a quench medium around said reactor in indirect heat exchange therewith;
means to inject said quench medium into a downstream portion of said reactor to stop production of carbon black.

13. A carbon black reactor comprising:
a generally cylindrical inner shell;
an annular peripheral feed inlet near one end of said shell;
an axial feed inlet containing flow directing means to impart rotation discharging adjacent said annular inlet at said one end of said shell;
an outer generally cylindrical chamber surrounding said shell;
fluid inlet means for said chamber near said one end of said shell;
fluid injection means communicating with said space within said shell and said chamber near the other end of said shell; and
fluid discharge means from said other end of said shell.

14. A carbon black reactor comprising:
a generally cylindrical inner shell;
an annular peripheral feed inlet near one end of said shell;
an annular inwardly extending raised portion in an intermediate section of said shell to impart mixing to fluids passing through said shell;
an axial feed inlet containing flow directing means to impart rotation discharging adjacent said annular inlet at said one end of said shell;
an outer generally cylindrical chamber surrounding said shell;
fluid inlet means for said chamber near said one end of said shell;
fluid injection means communicating with said space within said space within said shell and said chamber near the other end of said shell; and
fluid discharge means from said other end of said shell.

(References on following page)

References Cited by the Examiner

UNITED STATES PATENTS

| | | | |
|---|---|---|---|
| 2,368,827 | 2/1945 | Hanson et al. | 23—259.5 |
| 2,790,838 | 4/1957 | Schrader | 260—679 |
| 2,851,337 | 9/1958 | Heller | 23—209.4 |
| 2,976,128 | 3/1961 | Latham et al. | 23—209.6 |
| 2,985,698 | 5/1961 | Pechtold et al. | 260—697 X |
| 3,009,784 | 11/1961 | Krejci | 23—209.4 |

FOREIGN PATENTS

| | | |
|---|---|---|
| 455,047 | 3/1949 | Canada. |
| 848,419 | 9/1960 | Great Britain. |

OSCAR R. VERTIZ, *Primary Examiner.*

MAURICE A. BRINDISI, *Examiner.*

S. R. BRESCH, E. J. MEROS, *Assistant Examiners.*